(12) United States Patent
Yeh et al.

(10) Patent No.: US 9,019,678 B2
(45) Date of Patent: Apr. 28, 2015

(54) PROTECTION COMPONENT AND PROTECTION DEVICE USING THE SAME

(75) Inventors: Hsin-Hsien Yeh, Taichung (TW); Hong-Ching Lin, Kaohsiung (TW); Tsung-Wen Chen, Hsinchu (TW); Wen-Hao Deng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 279 days.

(21) Appl. No.: 13/587,005

(22) Filed: Aug. 16, 2012

(65) Prior Publication Data

US 2013/0044401 A1 Feb. 21, 2013

(30) Foreign Application Priority Data

Aug. 18, 2011 (TW) .............................. 100129499 A
Jul. 3, 2012 (TW) .............................. 101123841 A

(51) Int. Cl.
*H02H 5/04* (2006.01)
*H02H 3/20* (2006.01)
*H02H 7/18* (2006.01)
*H01H 85/00* (2006.01)
*H01M 10/44* (2006.01)
*H01M 10/48* (2006.01)
*H02H 3/08* (2006.01)
*H02H 9/02* (2006.01)
*H01H 85/10* (2006.01)
*H01H 85/12* (2006.01)

(52) U.S. Cl.
CPC ................ *H02H 3/202* (2013.01); *H02H 7/18* (2013.01); *H01H 85/0039* (2013.01); *H01H 85/10* (2013.01); *H01H 85/12* (2013.01); *H01M 10/446* (2013.01); *H01M 10/486* (2013.01)

(58) Field of Classification Search
USPC .................................................. 361/93.7, 104
See application file for complete search history.

(56) References Cited

U.S. PATENT DOCUMENTS 3,828,289 A * 8/1974 Hickling ........................... 337/5
6,075,344 A 6/2000 Kawai
(Continued)

FOREIGN PATENT DOCUMENTS

CN 2399872 Y 10/2000
CN 101040415 A 9/2007
(Continued)

OTHER PUBLICATIONS

Chiou Hung-Jr; Current protecting element structure, and method of manufacturing the same; Filing date: Mar. 4, 2009, publication date: Oct. 28, 2010; Abstract, Specification, Drawings 1-10.*
(Continued)

*Primary Examiner* — Dharti Patel
(74) *Attorney, Agent, or Firm* — Birch, Stewart, Kolasch & Birch, LLP

(57) ABSTRACT

A protection component includes: a package substrate; a first fuse unit disposed in the package substrate, having a first fusing region; a second fuse unit disposed in the package substrate, having a second fusing region which is close to the first fusing region; and a first buried cave disposed in the package substrate corresponding to the first and second fusing regions. When one of the first and second fusing regions is blown out, the first buried cave assists energy of fuse melting to break the other of the first and second fusing regions.

21 Claims, 13 Drawing Sheets

(56) References Cited

U.S. PATENT DOCUMENTS

| | | | |
|---|---|---|---|
| 6,351,361 B1 | 2/2002 | Kawazu et al. | |
| 6,583,977 B1 * | 6/2003 | Oglesbee | 361/104 |
| 7,286,037 B2 | 10/2007 | Furuuchi | |
| 7,529,072 B2 * | 5/2009 | Nishikawa | 361/104 |
| 7,663,204 B2 * | 2/2010 | Hsu et al. | 257/529 |
| 2007/0102814 A1 * | 5/2007 | Baek | 257/734 |
| 2009/0058898 A1 * | 3/2009 | Yamada et al. | 347/9 |
| 2011/0012704 A1 | 1/2011 | Kimura et al. | |

FOREIGN PATENT DOCUMENTS

| | | |
|---|---|---|
| CN | 102110862 A | 6/2011 |
| CN | 202307755 U | 7/2012 |
| JP | 10-308157 A | 11/1998 |
| JP | 2010-244773 A | 10/2010 |

OTHER PUBLICATIONS

JP Office Action dated Aug. 6, 2013 and English translation; 7 pages.

* cited by examiner

PROTECTION COMPONENT AND PROTECTION DEVICE USING THE SAME

CROSS REFERENCE TO RELATED APPLICATIONS

The present application is based on, and claims priority from, Taiwan Applications Serial Number 100129499, filed Aug. 18, 2011 and Serial Number 101123841, filed Jul. 3, 2012, the disclosures of which are hereby incorporated by reference herein in their entirety.

TECHNICAL FIELD

The technical field relates to protection components, and in particular relates to protection components which cut off power supply through assisting of buried caves and relates to protection devices using the same.

BACKGROUND

Rechargeable batteries are used in portable devices like mobile phones and notebooks. Especially, rechargeable lithium batteries having performance not degraded by memory effects are wildly used in portable devices. Safety factors are crucial when charging lithium batteries, as fires or explosions might occur if under abnormal conditions or incorrect operations. Therefore, commercialized lithium battery sets must provide protection circuits for controlling charging/discharging operations. Multi-functional fuses (protection components) have the advantage of taking up smaller space and providing multiple protections, thus being often used as a basic part of lithium battery sets nowadays. Many corporations and research institutes have spent resources on developing a plurality of multi-functional fuses for commercial benefits from rechargeable battery and other electronic equipment applications.

SUMMARY

The disclosure provides protection components culling off power supply through assisting of buried caves and a protection devices using the same.

According to an exemplary embodiment of the disclosure, a protection component, comprises: a package substrate; a first fuse unit disposed in the package substrate, having a first fusing region; a second fuse unit disposed in the package substrate, having a second fusing region which is close to the first fusing region; and a first buried cave disposed in the package substrate corresponding to the first and second fusing regions; wherein when one of the first and second fusing regions is blown out, the first buried cave assists an energy of fuse melting to break the other of the first and second fusing regions.

The disclosure further provides a protection device using the protect component of the exemplary embodiment of the disclosure. The protection device comprises: the protection component of the exemplary embodiment described above; a sense unit; and a switch unit. The protection component further comprises: a first electrode connected to a first terminal of the first fuse unit, receiving electric power from at least a voltage source; a second electrode connected to a second terminal of the first fuse unit, supplying the electric power to a load device; and a third electrode connected to a first terminal of the second fuse unit; wherein a second terminal of the second fuse unit is selectively connected to one of the first and second electrodes. The sense unit is coupled to the protection component and the load device, outputting a protection signal when the electric power sensed by the sense unit is higher than a predetermined value. The switch unit is coupled between the third electrode and a reference node, and the switch unit turns on and bypasses the electric power supposed to be supplied to the load device to the reference node when the switch unit receives the protection signal.

BRIEF DESCRIPTION OF DRAWINGS

The present disclosure can be more fully understood by reading the subsequent detailed description and examples with references made to the accompanying drawings, wherein.

DETAILED DESCRIPTION

Figure 1A:
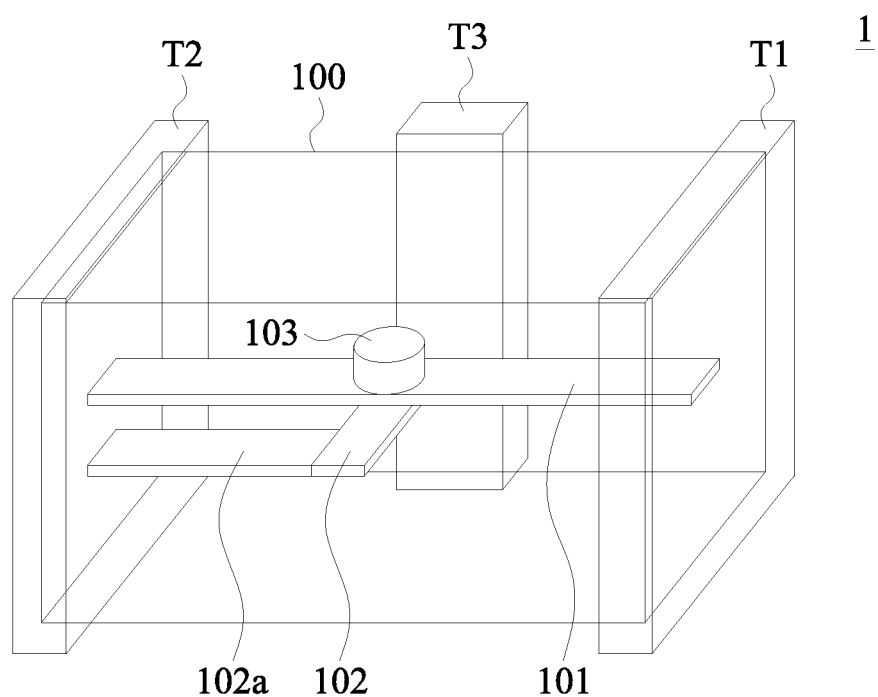
FIG. 1A shows schematic structure of a protection component 1 according to an exemplary embodiment of the disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 1B:
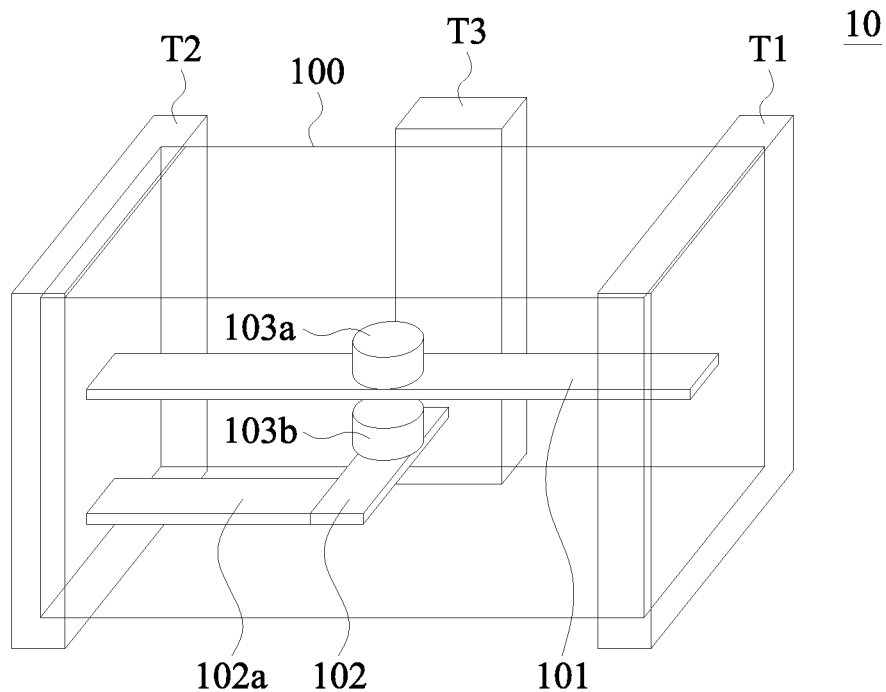
FIG. 1B shows schematic structure of a protection component 10 according to another exemplary embodiment of the disclosure.
Figure 1C:
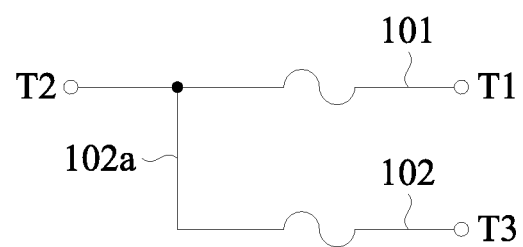
FIG. 1C shows an equivalent circuit diagram of the protection components 1 and 10 depicted in FIGS. 1A and 1B.

FIGS. 1A and 1B respectively show schematic structures of protection components 1 and 10 according to exemplary embodiments of the disclosure. FIG. 1C shows an equivalent circuit diagram of the protection components 1 and 10 depicted in FIGS. 1A and 1B.

Referring to FIG. 1A, the protection component 1 comprises a package substrate 100, a first fuse unit 101 disposed in the package substrate 100, a second fuse unit 102 disposed in the package substrate 100, and a buried cave (or chamber) 103 disposed in the package substrate 100. The first and second fuse units 101 and 102 respectively extend along a first and a second direction. In FIG. 1A, the first fuse unit 101 crosses over the second fuse unit 102. The buried cave 103 is an enclosed space not exposed to outside of the package substrate 100.

In this embodiment, the enclosed space 103 may be provided at the intersection of the first and second fuse units 101 and 102. In FIG. 1A, the buried cave 103 is provided on/over the first fuse unit 101. However, the buried cave may be provided below the second fuse unit 102 or between the first and second fuse units 101 and 102. The first fuse units 101 and/or the second fuse unit 102 can be partially exposed to the buried cave 103.

Compared to the protection component 1 in FIG. 1A, the main difference is that the protection component 10 in FIG. 1B has two buried caves 103a and 103b disposed in the package substrate 100.

The buried caves 103a and 103b are independent enclosed spaces and are not exposed to the outside of the package substrate 100. The buried caves 103a and 103b are disposed at the intersection of the first fuse unit 101 and the second fuse unit 102.

The first fuse unit 101 and the second fuse unit 102, for example, are fuse devices with a fusing region or a fuse active portion (not shown) for melting operation. In some embodiments of the disclosure, the fusing regions of the first fuse unit 101 and the second fuse unit 102 may cross each other.

For example, when the second fuse unit 102 is blown out due to functioning of the protection component 1 or 10, energy (in form of explosion, heat, steam pressure, arc, etc.) generated from fuse melting can be guided or strengthened by the buried cave 103b (or the buried cave 103a) to structurally break or destroy the first fuse unit 101 all together.

Referring to FIGS. 1A and 1B, the protection components 1 and 10 both comprise a first electrode T1, a second electrode T2, and a third electrode T3. A first terminal and a second terminal of the first fuse unit 101 extend to the outside of the package substrate 100 and electrically connect the first electrode T1 and the second electrode T2, respectively. A first terminal of the second fuse unit 102 extends to the outside of the package substrate 100 and electrically connects the third electrode T3. In this embodiment, a second terminal of the second fuse unit 102 electrically connects the second electrode T2 through a connecting portion 102a. FIG. 1C is an equivalent circuit diagram of the protection components 1 and 10, as shown in FIGS. 1A and 1B.

In this embodiment, the first direction and the second direction are substantially perpendicular to each other, but are not intended to limit thereto.

Various embodiments of the protection components 1 and 10 having various arrangements of buried caves will be described in following descriptions, in conjunction with cross sectional views of the protection components 1 and 10 of FIGS. 1A and 1B along the first direction. In following figures, same reference numeral in different figures represents the same component or the same structural part. For clear description, corresponding parts of the protection components in FIG. 1A and 1B may be indicated with different reference numerals. Please refer to the detailed descriptions and numerals of the corresponding figures for better understanding.

Figure 2A:
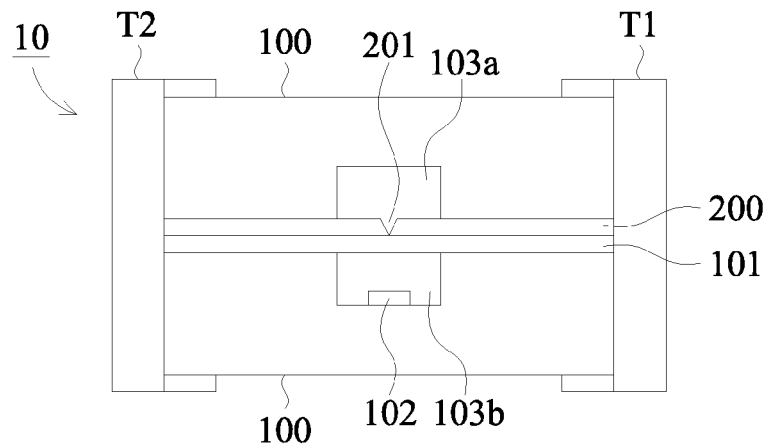
FIGS. 2A to 2C show cross sectional views of three exemplary protection components 10 along the first direction.
Figure 2B:
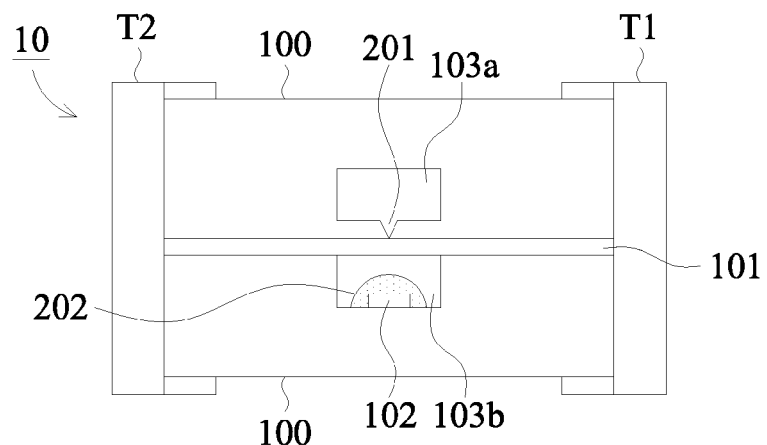
Figure 2C:
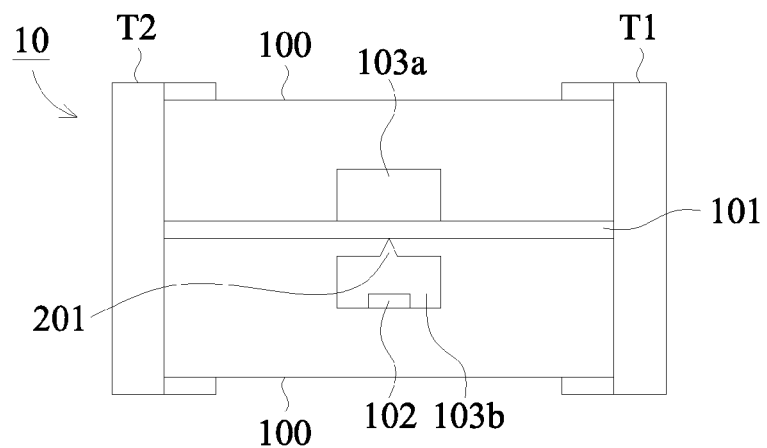

FIGS. 2A to 2C show cross sectional views of three exemplary protection components along the first direction.

Compared to FIG. 1B, the protection component 10 in FIG. 2A further comprises a partition 200 formed in the package substrate 100, and material of the partition 200 can be the same as that of the package substrate 100. The first fuse unit 101 is formed on a surface of the partition 200. Here, the first fuse unit 101 is formed on a back surface of the partition 200 for example, but it also can be formed on a front surface (opposite to the back surface) of the partition 200. The buried caves 103a and 103b are provided at the intersection of the first fuse unit 101 and the second fuse unit 102. The first fuse unit 101 and the second fuse unit 102 are partially exposed to the buried cave 103b. In the embodiment of FIG. 2A, a weakening defect 201, such as a crack or a gap, is formed on the partition 200. When one of the first fuse unit 101 and the second fuse unit 102 is blown out, the weakening defect 201 makes breaking of the partition 200 more easily, and results in the subsequent breaking of the other fuse unit.

Compared to FIG. 2A, the protection component 10 in FIG. 2B comprises a high volatility material 202 partially or entirely covering a portion of the second fuse unit 102 exposed in the buried cave 103b. The high volatility material 202 may be metals with low melting points, polymer materials or glass, etc. but is not limited thereto. The high volatility material 202 is for strengthening the destructive force released from the blown-out of the second fuse unit 102, to break the first fuse unit 101. Furthermore, compared to FIG. 2A, the partition and package substrate 100 in FIG. 2B are made of same material and thus integrally constructed. The partition is not indicted by numeral 200 but the weakening defect 201 is still shown in FIG. 2B. In embodiments described in the disclosure, if the partition and the package substrate are made of same material and integrally constructed, the partition will not be indicated by numeral 200 or symbol for brevity and clarity.

Compared to FIG. 2A, the first fuse unit 101 in FIG. 2C is partially exposed to the buried cave 103a and a portion of the second fuse unit 102 and the weakening defect 201 are exposed to the buried cave 103b. The partition 200 and the package substrate 100 in FIG. 2C are made of the same material. In FIG. 2C, the partition and package substrate 100 are made of same material.

Figure 3:
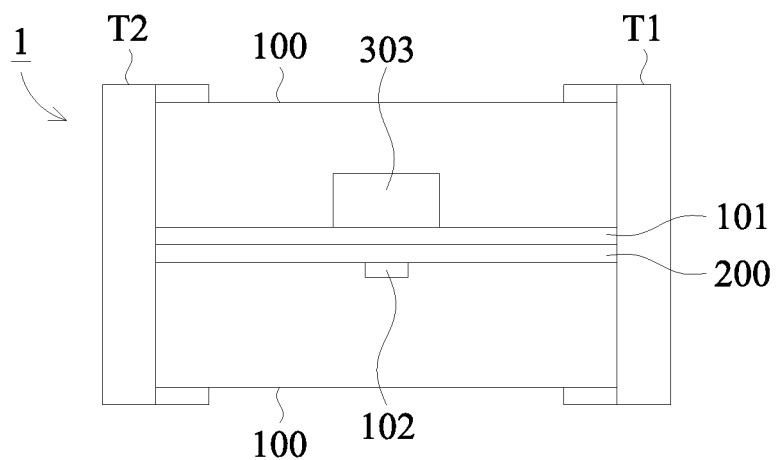
FIG. 3 shows another embodiment of the protection component 1, in cross sectional view along the first direction.

FIG. 3 shows another embodiment of the protection component 1, in cross sectional view along the first direction.

Compared to FIG. 1A, the protection component 1 of FIG. 3 further comprises a partition 200 formed in the package substrate 100, the partition 200 and the package substrate 100 may be made of the same material. The first fuse unit 101 is formed on a first surface of the partition 200, and the second fuse unit 102 is formed on the opposite surface of the partition 200 corresponding to the first surface. Only one buried cave 303 is provided at the intersection of the first and the second fuse unit 101 and 102 in the protection component 1 of FIG. 3. The first fuse unit 101 is partially exposed to the buried cave 303. When the second fuse unit 102 is blown out, destructive forces (resulting from energy of fuse melting) are guided by the buried cave 303 to successively break the first fuse unit 101.

Figure 4A:
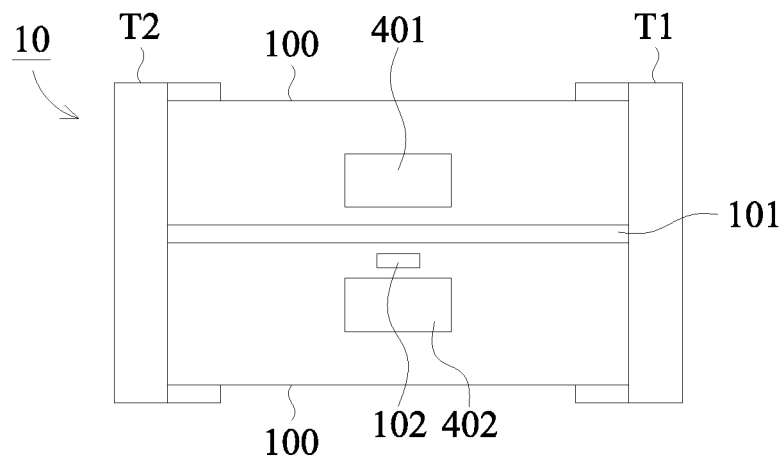
FIGS. 4A and 4B show another two embodiments of the protection component 10, in cross sectional view along the first direction.
Figure 4B:
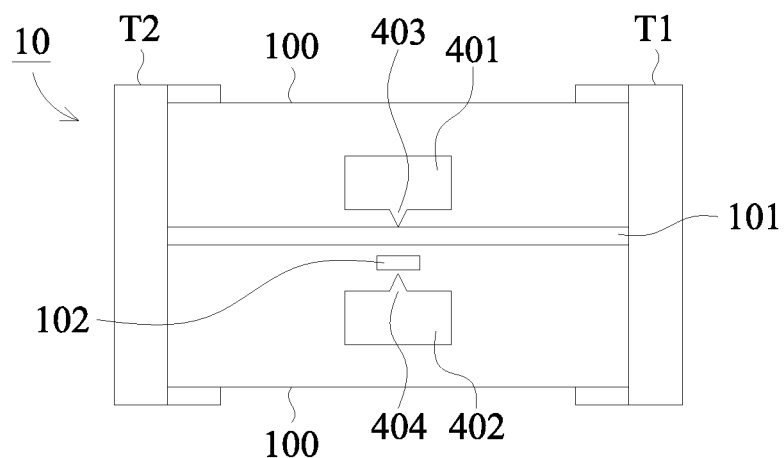

FIGS. 4A and 4B show another two embodiments of the protection component 10, in cross sectional view along the first direction.

Referring to FIG. 4A, the protection component 10 comprises buried caves 401 and 402 disposed in the package substrate 100. The buried caves 401 and 402 sandwich the intersection of the first and the second fuse units 101 and 102. Note that neither the first fuse unit 101 nor the second fuse unit 102 is exposed to the buried caves 401 or 402.

The difference between the embodiments of FIG. 4B and FIG. 4A is that the buried cave 401 in FIG. 4B comprises a weakening defect 403 provided close to the first fuse unit 101 and a weakening defect 404 provided close to the second fuse unit 102.

Figure 5A:
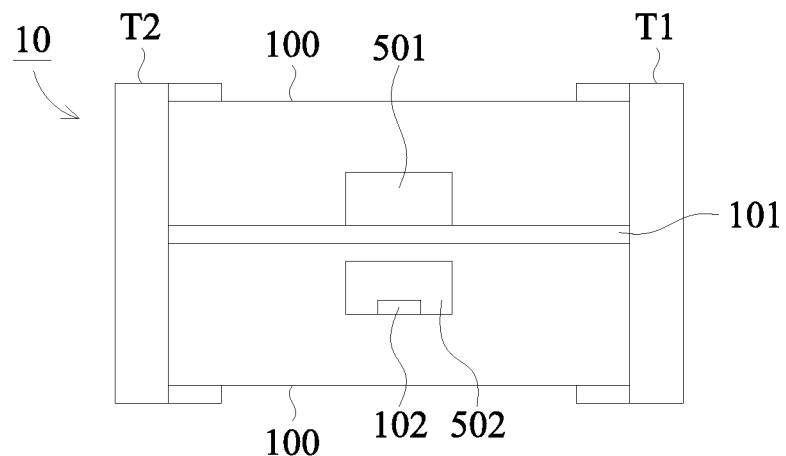
FIGS. 5A and 5B show another two embodiments of the protection component 10, in cross sectional view along the first direction.
Figure 5B:
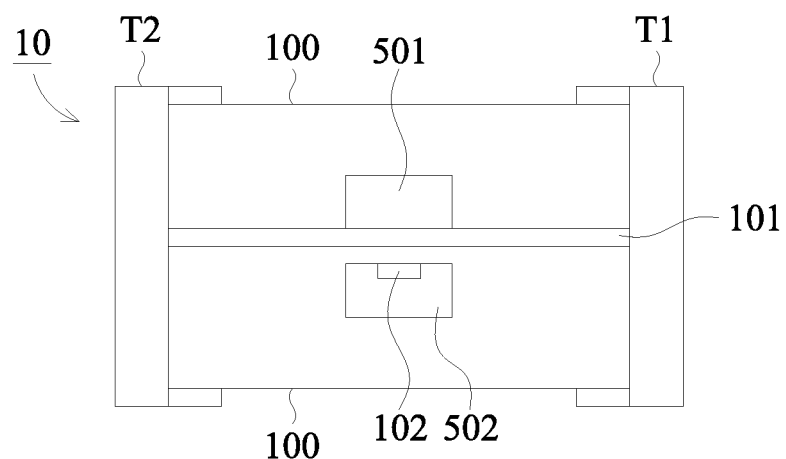

FIGS. 5A and 5B show another two embodiments of the protection component 10, in cross sectional view along the first direction.

Referring to FIG. 5A, the protection component 10 comprises buried caves 501 and 502 disposed in the package substrate 100 and close to the intersection of the first and the second fuse units 101 and 102. The first fuse unit 101 is partially exposed to the buried cave 501, and the second fuse unit 102 is partially exposed to the buried cave 502, respectively. Structures of the embodiments in FIG. 5B and FIG. 5A are almost the same except that the distance between the first and the second fuse units 101 and 102 in FIG. 5A is longer than that in FIG. 5B. Referring to FIG. 5B, the first and the second fuse units 101 and 102 are disposed on opposite surfaces of the partition. The partition is formed of the same material as the package substrate, thus not indicated in FIG. 5B.

Furthermore, a high volatility material layer (not shown in FIGS. 5A and 5B) can be provided to partially or entirely cover the second fuse unit 102 exposed to the buried cave 502.

Figure 6A:
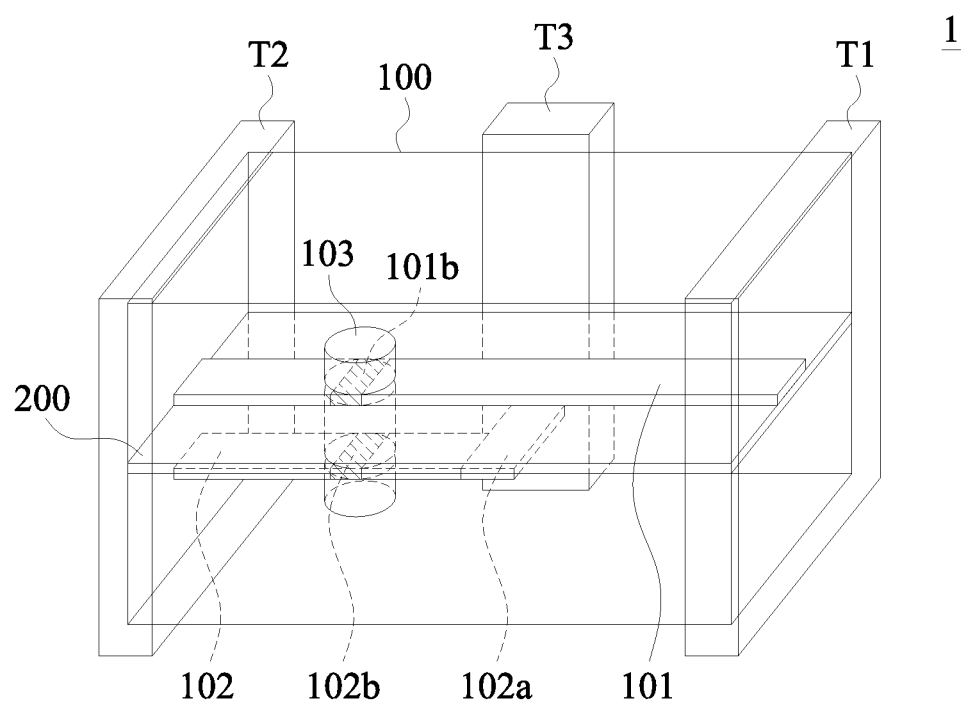
FIGS. 6A to 6C respectively show schematic structures of protection components 1 and 10 according to another three embodiments of the disclosure.
Figure 6B:
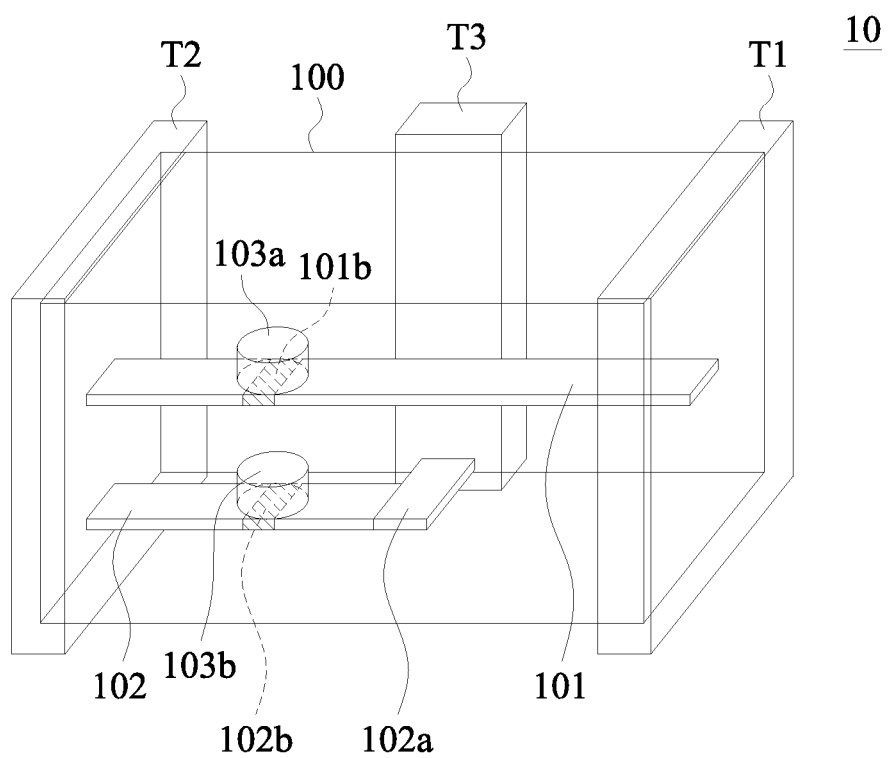
Figure 6C:
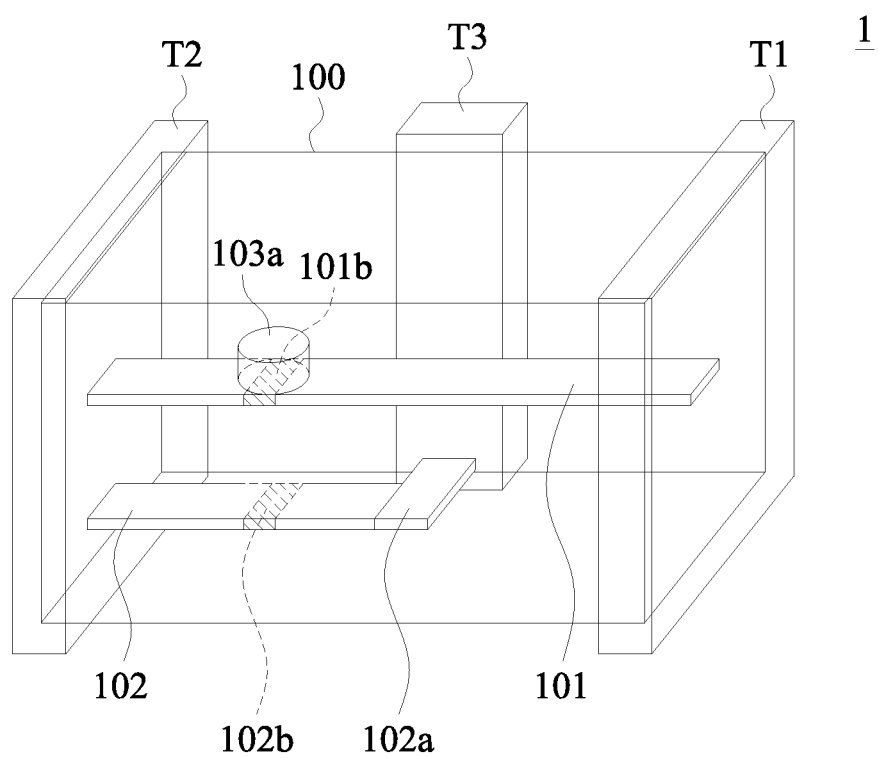
Figure 7A:
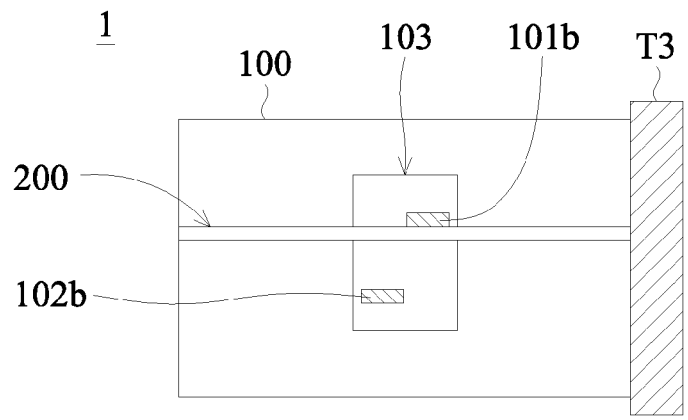
FIGS. 7A to 7C respectively show cross sectional views of the protection components 1 and 10 in FIGS. 6A to 6C, along a second direction.
Figure 7B:
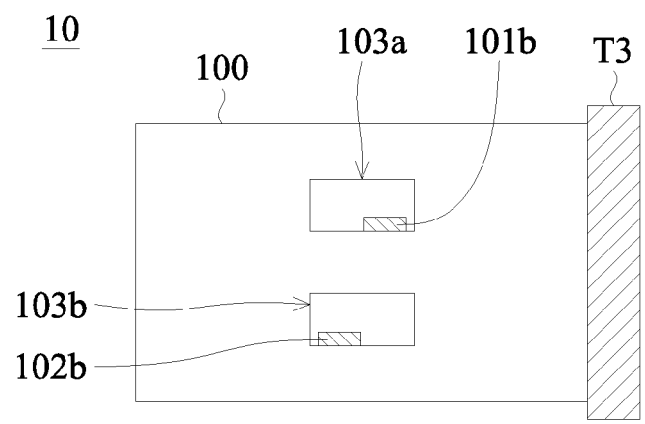
Figure 7C:
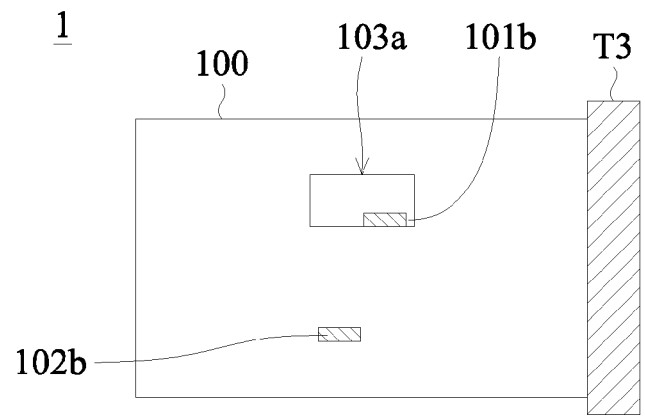

FIGS. 6A to 6C respectively show schematic structures of protection components 1 and 10 according to another three embodiments of the disclosure. FIGS. 7A to 7C respectively show cross sectional views of the protection components 1 and 10 in FIGS. 6A to 6C, along a second direction.

Referring to FIG. 6A, the protection component 1 comprises a package substrate 100, a first fuse unit 101 disposed in the package substrate 100, a second fuse unit 102 disposed in the package substrate 100, and a buried cave 103 disposed in the package substrate 100. The first fuse unit 101 has a first fusing region 101b and the second fuse unit 102 has a second fusing region 102b. The first and second fuse units 101 and 102 both extend along a first direction perpendicular to the second direction. In FIG. 6A, the first fuse unit 101 is parallel to the second fuse unit 102. The buried cave 103 is an enclosed space not exposed to outside of the package substrate 100 and is provided correspond to the first and second fusing regions 101b and 102b. In this embodiment of FIG. 6A, the first and second fusing regions 101b and 102b are exposed to the buried cave 103.

The protection component 1 further comprises a partition 200 disposed in the package substrate 100, separating the first fusing region 101b (the fuse unit 101) and the second fusing region 102b (the fuse unit 102). The partition 200 and the package substrate 100 may be made of same material. A weakening defect (not shown in FIG. 6A), such as a crack or a gap, may be formed on the partition 200. When one of the first and second fuse units 101 and 102 is blown out, the weakening defect makes the energy of fuse melting to break the partition 200 more easily, and results in the subsequent breaking of the other fuse unit. In some embodiment, the protection component 1 may further comprises a high volatility material (not shown) partially or entirely covering the second fusing region 102b exposed to the buried cave 103. The high volatility material may be metals with low melting points, polymer materials or glass, etc. but is not limited thereto. The high volatility material is for strengthening the destructive force released from the blown-out of the second fusing region 102b, to break the first fusing region 101b. The partition and the high volatility material are described in detail by referring to the FIGS. 2A to 2C and their related descriptions.

Referring to FIG. 7A, the first and second fusing regions 101b and 102b are disposed close to each other. In some embodiment, the distance between the first and second fusing regions 101b and 102b is the minimal distance between the first and second fuse units 101 and 102. In this embodiment, the first fusing region 101b and the second fusing region 102b are not overlapped. However, the first fusing region 101b and the second fusing region 102b also can be entirely or partially overlapped. In FIG. 7A, the first fusing region 101b (the first fuse unit 101) is disposed on the partition 200.

The protection component 1 further comprises a first electrode T1, a second electrode T2 and a third electrode T3. A first ten final and a second terminal of the first fuse unit 101 respectively extend out of the package substrate 100 and connect the first electrode T1 and second electrode T2. A first terminal of the second fuse unit 102 extends out of the package substrate 100 and connects the second electrode T2. A second terminal of the second fuse unit 102 connects the third electrode T3 through a connecting portion 102a. Here, the connecting portion 102a is disposed substantially along the second direction.

FIG. 6B shows a schematic structure of a protection component 10 according to another embodiment of the disclosure. FIG. 7B shows a cross sectional view of the protection component 10 in FIG. 6B, along the second direction. Compared to the protection component 1 of FIG. 6A, the main difference is that the protection component 10 of FIG. 6B has a first and a second buried cave 103a and 103b. The first and second buried caves 103a and 103b are independent enclosed spaces. The first buried cave 103a is provided on the first fusing region 101b and the first fusing region 10 1b is exposed at the bottom of the first buried cave 103a. The second buried cave 103b is provided below the first buried cave 103a and the second fusing region 102b is exposed at the bottom (or top) of the first buried cave 103a. Here, the second fusing region 102b is exposed at the bottom of the second buried cave 103b, for example.

The protection component 10 further comprises a first electrode T1, a second electrode T2 and a third electrode T3. A first terminal and a second terminal of the first fuse unit 101 respectively extend out of the package substrate 100 and connect the first electrode T1 and second electrode T2. A first terminal of the second fuse unit 102 extends out of the package substrate 100 and connects the second electrode T2. A second terminal of the second fuse unit 102 connects the third electrode T3 through a connecting portion 102a. Here, the connecting portion 102a is disposed substantially along the second direction.

Referring to FIG. 7B, the first and second fusing regions 101b and 102b are disposed close to each other. In some embodiment, the distance between the first and second fusing regions 101b and 102b is the minimal distance between the first and second fuse units 101 and 102. In this embodiment, the first fusing region 101b and the second fusing region 102b are not overlapped. However, the first fusing region 10 1b and the second fusing region 102b also can be entirely or partially overlapped.

FIG. 6C shows a schematic structure of a protection component 1 according to another embodiment of the disclosure. FIG. 7C shows a cross sectional view of the protection component 1 in FIG. 6C, along the second direction. Compared to the protection component 10 of FIG. 6B, the main difference is that the protection component 1 of FIG. 6C has only one buried cave 103a. The buried cave 103a is provided on the first fusing region 101b and the first fusing region 101b is exposed to the first buried cave 103a.

The protection component 1 of FIG. 6C further comprises a first electrode T1, a second electrode T2 and a third electrode T3. A first terminal and a second terminal of the first fuse unit 101 respectively extend out of the package substrate 100 and connect the first electrode T1 and second electrode T2. A first terminal of the second fuse unit 102 extends out of the package substrate 100 and connects the second electrode T2. A second terminal of the second fuse unit 102 connects the third electrode T3 through a connecting portion 102a. Here, the connecting portion 102a is disposed substantially along the second direction.

Referring to FIG. 7C, the first and second fusing regions 101b and 102b are disposed close to each other. In some embodiment, the distance between the first and second fusing regions 101b and 102b is the minimal distance between the first and second fuse units 101 and 102. In this embodiment, the first fusing region 101b and the second fusing region 102b are not overlapped. However, the first fusing region 101b and the second fusing region 102b also can be entirely or partially overlapped.

As for the protection components 1 and 10 of FIGS. 6A to 6C, when one of the first fusing region 101b and the second fusing region 102b is blown-out, the energy of fuse melting will break the other fusing region. For example, when the second fusing region 102b of the second fuse unit 102 is blown out due to functioning of the protection components 1 and 10, energy (in form of explosion, heat, steam pressure, arc, etc.) generated from fuse melting can be guided or strengthened by the buried cave 103 or 103a of FIG. 6A or 6C (or the buried caves 103a and/or 103b) to structurally break or destroy the first fusing region 101b of first fuse unit 101 altogether.

Exemplary embodiments of protection devices using the protection components (1 or 10) disclosed above are described as follows. Using the protection component 1 or 10 for the protection device can achieve the same performance.

Figure 8A:
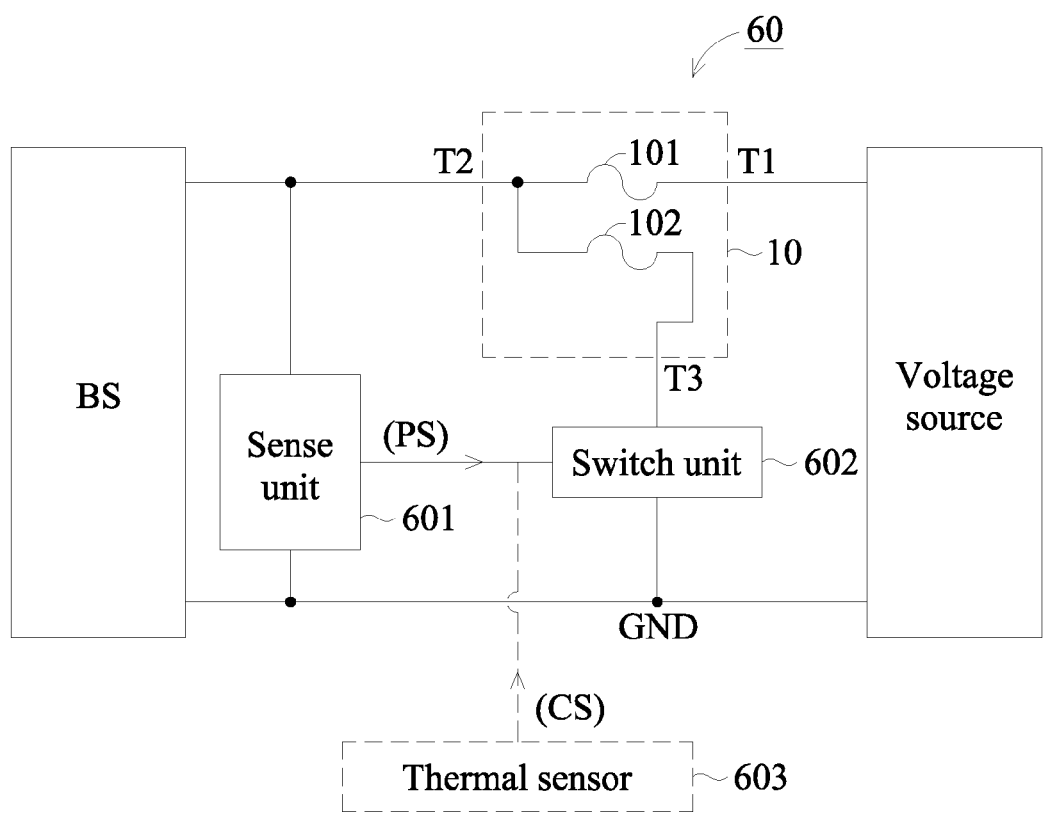
FIGS. 8A to 8c show three exemplary embodiment of the protection device 60 using the protection component of the disclosure.

FIG. 8A shows a protection device 60 using the protection component 10 disclosed above. The protection device 60 comprises the protection component 10 disclosed above, a sense unit 601, and a switch unit 602. In this embodiment, the protection device 60 is for protecting a load device coupled to a voltage source, and the load device, for example, is a lithium battery set (rechargeable battery set) BS in a notebook computer, but not limited to it. The protection device 60 can be utilized to protect any other electronic apparatus.

The protection component 10 has the first and the second fuse unit 101 and 102, and comprises a first, a second, and a third electrode (T1 to T3), as described in above embodiments. The first electrode T1 receives electric power provided by at least one voltage source. The second electrode T2 provides the electric power to the lithium battery set BS (or load device).

The voltage source provides the electric power to the lithium battery set BS through the first fuse unit 101. When a current flowing through the first fuse unit 101 surpasses a first withstand current level of the first fuse unit 101 due to malfunction or other causes, i.e. an over-current event occurring, the first fuse unit 101 is blown out to cut off the electric power provided by the voltage source and protects the lithium battery set BS from destruction by the over-current event.

The switch unit 602 is coupled between the third electrode T3 and a reference voltage node (for example, a reference ground node, GND). In this embodiment, the switch unit 602 is a field-effect transistor, but is not limited thereto.

In FIG. 8A, the sense unit 601 electrically connects both terminals of the lithium battery set BS to detect whether the applied voltage across the lithium battery set BS has exceeded a predetermined voltage level or not. When the applied voltage has exceeded the predetermined voltage level, i.e. an over-voltage event occurring, the sensor unit 601 sends a protection signal PS to turn on the switch unit 602. The voltage supposed to be applied to the lithium battery set BS will be bypassed through the second fuse unit 102 and the switch unit 602 to the reference ground node GND. When one of the first fuse unit 101 and the second fuse unit 102 is blown out during the over-voltage event, destructive force resulting from energy of fuse melting will successively breaks the other fuse unit, and the lithium battery set BS is electrically isolated from the voltage source to protect the lithium battery set BS and the voltage source from damage.

Furthermore, an alternative embodiment may configure a second withstand current level of the second fuse unit 102 to be lower than the first withstand current level of the first fuse unit 101. When the current flowing through the second fuse unit 102 is larger than the second withstand current level (but lower than the first withstand current level), the second fuse unit 102 is blown out. The destructive energy resulting from fuse melting further breaks the first fuse unit 101 to completely isolate the lithium battery set BS from the voltage source. The lithium battery set BS and the voltage source are thus protected from damage.

Figure 8B:
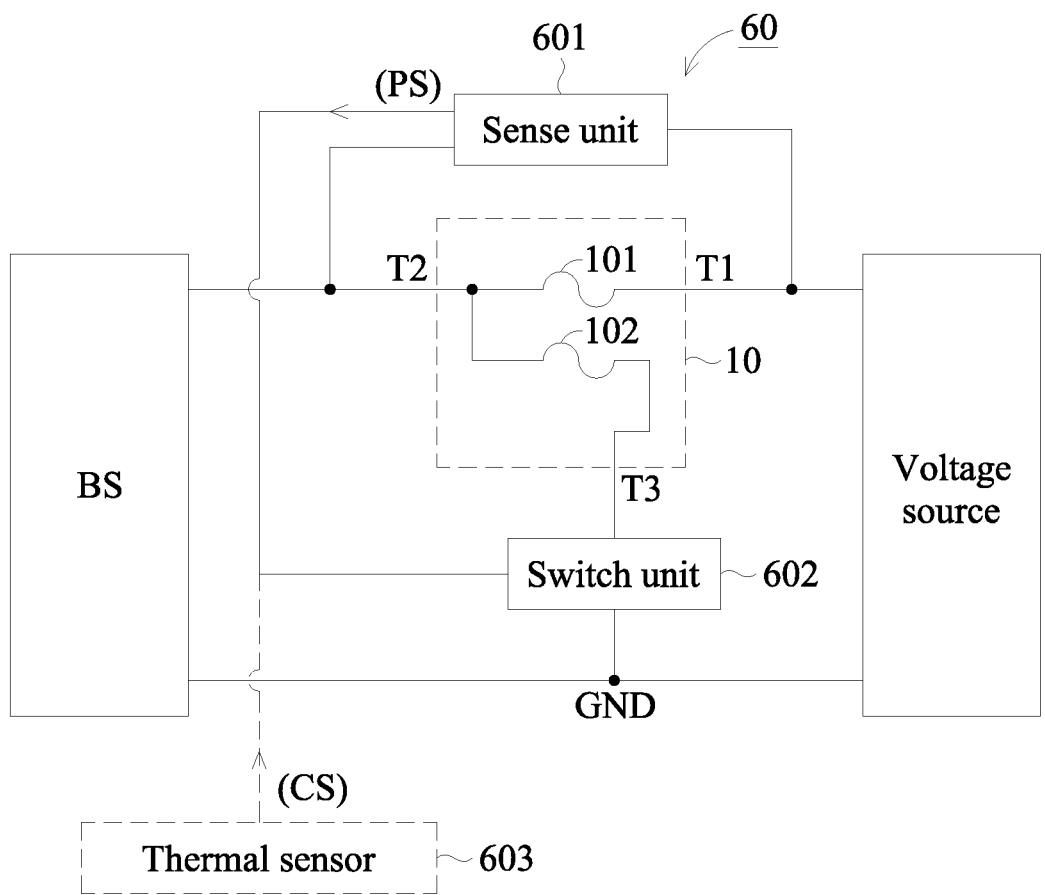

FIG. 8B shows another embodiment of the protection device 60 using the protection component 10. Similar to FIG. 8A, when a current flowing through the first fuse unit 101 surpasses the first withstand current level of the first fuse unit 101 due to malfunction or other causes, i.e. an over-current event occurring, the first fuse unit 101 is blown out to cut off the electric power provided by the voltage source. The lithium battery set BS and the voltage source are protected from damage.

In FIG. 8B, the sense unit 601 is coupled between two terminals (T1, T2) of the first fuse unit 101. The sense unit 601 detects a first voltage difference between the first electrode T1 and the reference ground node GND, and a second voltage difference between the second electrode T2 and the reference ground node GND; whereby the sensor unit 601 monitors the voltage drop across the first fuse unit 101 (the voltage drop across the first and second electrodes T1, T2) and the voltage applied to the lithium battery set BS (the voltage drop across the second electrode T2 and the ground node GND).

When the voltage applied to the lithium battery set BS surpasses the predetermined voltage level, the sensor unit 601 sends a protection signal PS to turn on the switch unit 602. The voltage supposed to be applied to the lithium battery set BS will be bypassed through the second fuse unit 102 and the switch unit 602 to the reference ground node GND.

Furthermore, the sensor unit 601 can obtain a current I1 (not shown in FIGS. 8A and 8B) flowing through the first fuse unit 101 by using the resistance of the first fuse unit 101 and the voltage drop across the first fuse unit 101. When the sense unit 601 senses that current I1 flowing through the first fuse unit 101 is smaller than a first withstand current level of the first fuse unit 101 but is larger than an alert current level, the sensor unit 601 sends the protection signal PS to turn on the switch unit 602 and allows the current I1 to flow through the switch unit 602 and the second fuse unit 102. A second withstand current level of the second fuse unit 102 may be equal to or smaller than the first withstand current level of the first fuse unit 101.

In this embodiment, supposed that the first and the second withstand current levels of the first fuse units 101 and 102 are 12 ampere and 4 ampere respectively; and the alert current level is 7 ampere. When the voltage source charges up the lithium battery set BS, although the current I1 flowing through the first fuse unit 101 may not introduce an over-current event, if the current I1 continually exceeds the alert current level, the current I1 may cause damage to the lithium battery set BS. Therefore, the sensor unit 601 sends the protection signal PS to turn on the switch unit 602 when detecting that the current I1 flowing through the first fuse unit 101 has surpassed the alarm current level (i.e., I1>7 ampere). Thus, the current I1 will flow through the switch unit 602 and the second fuse unit 102. Due to the current I1 being larger than the second withstand current level (4 ampere), the second fuse unit 102 is blown out, and the destructive force resulting energy of fuse melting will further breaks the first fuse unit 101 to completely isolate the lithium battery set BS from the voltage source. According to the operations described above, suitable setting of the alert current level can provide further protection to the lithium battery set BS.

Figure 8C:
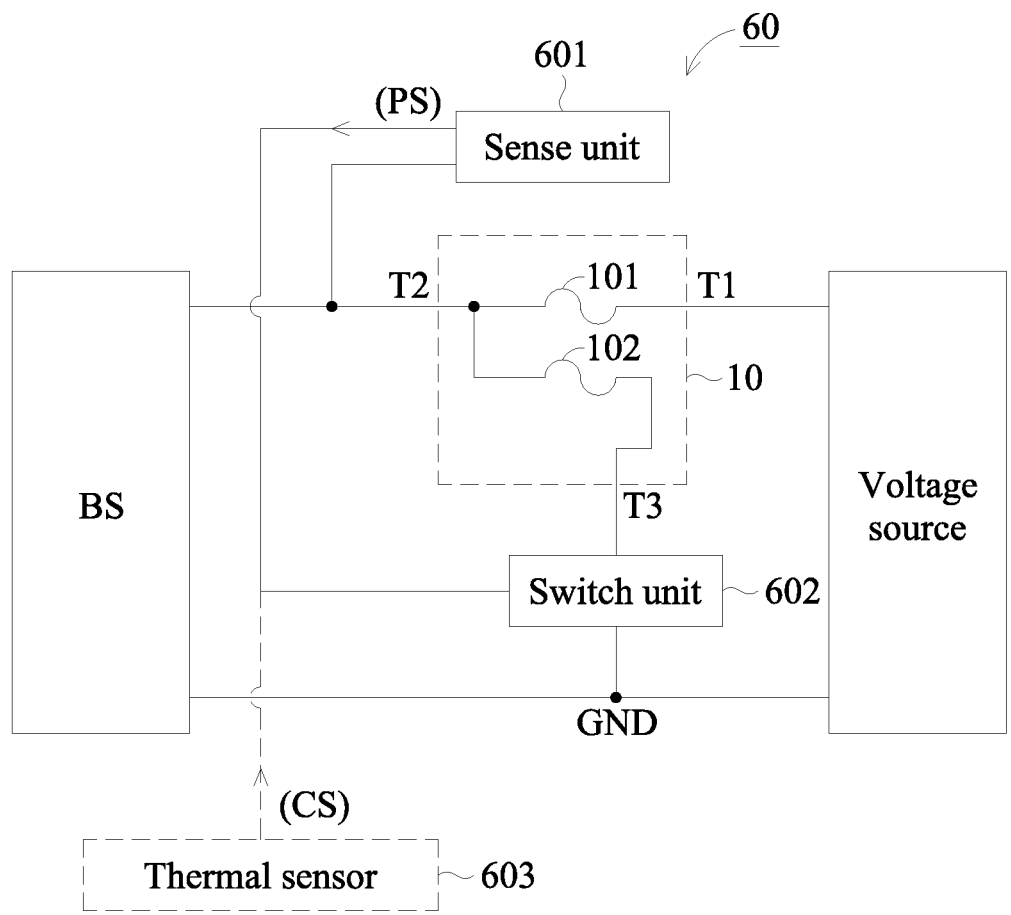

FIG. 8C shows a generic circuit diagram of FIGS. 8A and 8B. Devices and operations identical to that described in FIG. 8A and 8B will not be repeated in the following for brevity.

The sense unit 601 in FIG. 8C is connected to the protection component 10 and the lithium battery set BS. The sensor unit 601 may directly sense a voltage difference between two terminals of the lithium battery set BS, as described in FIGS. 8A and 8B, to detect whether an over-voltage event occurs or not. The sense unit 601 also may detect if the over-voltage event occurs according to a first monitor signal from a voltage monitor device installed in the lithium battery set BS. In addition, the sense unit 601 may otherwise detect if the current I1 exceeds the alert current level according to a second monitor signal from a current monitor device installed in the lithium battery set.

In an embodiment, the protection device 60 may further comprises a thermal sensor 603 to measure an ambient temperature or a temperature of the Lithium battery set BS. When the detected temperature exceeds a predetermined temperature level, the thermal sensor 603 generates a control signal CS to drive the switch unit 602 to bypass the electric power.

It is noted that if the first terminal T1 of the protection component 10 (or 1) is connected to the lithium battery set BS, and the second terminal T2 is connected to the voltage source, the protection component 10 (or 1) remains functional as described in FIG. 8A to 8C.

Based on descriptions of FIGS. 8A to 8C, the protection component of the disclosure comprises at least a buried cave and two fuse units. When an over-voltage or over-current event occurs, one of the first fuse unit 101 and the second fuse unit 102 is blown out and the energy from fuse melting can further break the other fuse unit through assisting of the buried cave, thus providing a thorough protection to the lithium battery set BS (load device) and the voltage source.

Embodiments and examples disclosed above are for the purpose of illustrating the general principles of the disclosure and should not be taken in a limiting sense. It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A protection component, comprising:
a package substrate;
a first fuse unit disposed in the package substrate, having a first fusing region;
a second fuse unit disposed in the package substrate, having a second fusing region which is close to the first fusing region; and
a first buried cave disposed in the package substrate corresponding to the first and second fusing regions;
wherein the first fuse unit and the second fuse unit are respectively disposed so that the first and second fusing regions cross each other up and down, and
wherein when one of the first and second fusing regions is blown out, the first buried cave assists energy of fuse melting to break the other of the first and second fusing regions.

2. The protection component as claimed in claim 1, further comprising a partition disposed in the package substrate, wherein the first fuse unit is provided on the partition.

3. The protection component as claimed in claim 2, wherein the partition comprises a weakening defect, provided corresponding to the first and second fusing regions to speed up breaking of the partition when one of the first and second fusing regions is blown out.

4. The protection component as claimed in claim 1, wherein the first fusing region is exposed to the first buried cave.

5. The protection component as claimed in claim 1, further comprising a second buried cave disposed in the package substrate corresponding to the first and second fusing regions, and below or over the first buried cave.

6. The protection component as claimed in claim 5, wherein the first and second fusing regions are exposed to the second buried cave.

7. The protection component as claimed in claim 5, wherein the second fusing region is exposed to the second buried cave, and the protection component further comprises a high-volatility material layer partially or entirely covering the second fusing region.

8. The protection component as claimed in claim 5, wherein the first fusing region is exposed to the first buried cave and the second fusing region is exposed to the second buried cave.

9. The protection component as claimed in claim 2, wherein the first fusing region is exposed to the first buried cave and the second fuse unit is provided on a back surface of the partition with respect to a front surface of the partition where the first fuse unit is provided.

10. The protection component as claimed in claim 1, further comprising a second buried cave disposed in the package substrate, wherein the first and second buried caves are configured to sandwich the first and second fusing regions.

11. The protection component as claimed in claim 10, further comprising a first and a second weakening defect respectively provided on positions close to the first and second fusing regions in the first and second buried caves.

12. The protection component as claimed in claim 10, wherein the first buried cave is disposed on the first fuse unit and the first fusing region is exposed at a bottom of the first buried cave; the second buried cave is disposed below the first buried cave and the second fusing region is exposed at a bottom or top of the second buried cave.

13. The protection component as claimed in claim 12, further comprising a high-volatility material layer partially or entirely covering the second fusing region exposed to the second buried cave.

14. The protection component as claimed in claim 1, further comprising a partition disposed in the package substrate, wherein the first and second fusing regions are exposed to the first buried cave and the first fusing region is provided on the partition.

15. The protection component as claimed in claim 14, wherein the partition further comprises a weakening defect, provided corresponding to the first and second fusing regions to speed up breaking of the partition when one of the first and second fusing regions is blown out.

16. The protection component as claimed in claim 14, further comprising a high-volatility material layer partially or entirely covering the first and second fusing regions exposed to the first enclosed space.

17. The protection component as claimed in claim 1, further comprising a first, a second and a third electrode; wherein a first and a second terminal of the first fuse unit extend out of the package substrate and respectively connect the first and second electrode, a first terminal of the second fuse unit extends out of the package substrate and connects the third electrode, and a second terminal of the second fuse unit selectively connects one of the first and second electrodes.

18. A protection device comprising:
the protection component of claim 1; the protection component further comprising:
a first electrode connected to a first terminal of the first fuse unit, receiving electric power from a voltage source;
a second electrode connected to a second terminal of the first fuse unit, supplying the electric power to a load device;
a third electrode connected to a first terminal of the second fuse unit; wherein a second terminal of the second fuse unit is selectively connected to one of the first and second electrodes;
a sense unit coupled to the protection component and the load device, outputting a protection signal when the electric power sensed by the sense unit is higher than a predetermined value; and
a switch unit coupled between the third electrode and a reference node, the switch unit turning on and bypassing the electric power supposed to be supplied to the load device, to the reference node when the switch unit receives the protection signal.

19. The protection device as claimed in claim 18, wherein the sense unit senses current or voltage applied to the load device to determine whether the electric power is higher than the predetermined value.

20. The protection device as claimed in claim 18, further comprising a thermal sensor to measure an ambient temperature or a temperature of the load, the thermal sensor outputting a control signal to turn on the switch unit when the measured temperature higher than a predetermined temperature.

21. The protection device as claimed in claim 18, wherein the load device is a rechargeable battery.

* * * * *